United States Patent
Christiansen et al.

(10) Patent No.: US 12,185,667 B2
(45) Date of Patent: Jan. 7, 2025

(54) RESIDUE SPREAD MONITORING

(71) Applicant: AGCO International GmbH, Neuhausen (CH)

(72) Inventors: Martin Peter Christiansen, Randers (DK); Morten Stigaard Laursen, Randers (DK); Ramon Buchaca Tarragona, Randers (DK)

(73) Assignee: AGCO International GmbH, Neuhausen (CH)

( * ) Notice: Subject to any disclaimer, the term of this patent is extended or adjusted under 35 U.S.C. 154(b) by 300 days.

(21) Appl. No.: 17/835,792

(22) Filed: Jun. 8, 2022

(65) Prior Publication Data

US 2022/0394924 A1 Dec. 15, 2022

(30) Foreign Application Priority Data

Jun. 9, 2021 (GB) .................................... 2108226

(51) Int. Cl.
*A01D 41/12* (2006.01)
*G01S 13/88* (2006.01)

(52) U.S. Cl.
CPC .......... *A01D 41/1243* (2013.01); *G01S 13/88* (2013.01)

(58) Field of Classification Search
CPC ............................ A01D 41/1243; G01S 13/88
See application file for complete search history.

(56) References Cited

U.S. PATENT DOCUMENTS

| | | | |
|---|---|---|---|
| 5,569,081 | A | 10/1996 | Baumgarten et al. |
| 9,668,418 | B2 | 6/2017 | Patton et al. |
| 10,470,365 | B2 | 11/2019 | Mahieu et al. |
| 2017/0086373 | A1 | 3/2017 | Mahieu et al. |
| 2018/0310474 | A1 | 11/2018 | Posselius et al. |
| 2020/0120869 | A1 | 4/2020 | Vandike et al. |
| 2020/0267355 | A1* | 8/2020 | Mentzer ................. G01B 11/14 |
| 2021/0034867 | A1 | 2/2021 | Ferrari et al. |

FOREIGN PATENT DOCUMENTS

| | | |
|---|---|---|
| EP | 1790207 A1 | 5/2007 |
| EP | 2131184 A1 | 12/2009 |
| EP | 3298880 A1 | 3/2018 |
| EP | 3494773 A1 | 6/2019 |
| JP | 2008118968 A | 5/2008 |
| WO | 2018/162699 A1 | 9/2018 |

OTHER PUBLICATIONS

UK Intellectual Property Office, Search report for UK Priority Application No. GB2108226.8, dated Dec. 8, 2021.

* cited by examiner

*Primary Examiner* — Michael V Kerrigan

(57) ABSTRACT

Systems and methods for monitoring the distribution of residue material from a spreader tool of an agricultural machine. A sensing arrangement including one or more sensors, with the sensors defining a sensing region corresponding to an operating area of the spreader tool. A lighting arrangement including one or more light sources for illumination to at least part of the sensing region depending on a capture state of the one or more sensors of the sensing arrangement.

15 Claims, 3 Drawing Sheets

RESIDUE SPREAD MONITORING

TECHNICAL FIELD

The present invention relates, in general, to systems and methods for monitoring residue spread from a harvesting machine.

BACKGROUND

Agricultural combines work to cut crop material from a field before separating the grain from the material other than grain (MOG) (referred to interchangeably as "residue") on board. Generally, the grain is transferred to a grain bin of the combine (where it may be temporarily stored) and the MOG is deposited back onto the field. A second operation may be performed to gather the deposited MOG, or the MOG may be used as a fertiliser for the soil in the field. In either case, it is important for the MOG to be distributed evenly during deposition, in order to ensure an efficient second harvesting operation (e.g. bailing of the MOG) or to ensure effective fertilisation of the soil. When residue is unevenly distributed over a field, not only are exposed areas at risk for erosion, but inconsistencies in soil temperatures and moisture also may cause uneven plant emergence the following year, hurting yield. Ideally, residue should be spread consistently and managed to promote uniform rapid warming and drying in the spring for earlier planting and sufficient seed germination. It is also important not to spread MOG or residue into standing crop adjacent to the machine—i.e. the crop to be harvested on the next pass by the machine—as spreading into standing crop may result in the same area being spread twice causing an unwanted built of residue in a given area, again leading to uniformity issues.

To control the distribution of the MOG, known combines include spreader tools which can include deflectors/steering vanes, fans or the like which are controllable by an operator of the combine. Generally, this is a manual process and the operator must observe the distribution of the MOG during operation and make any necessary adjustments to the spreader tool manually. The distribution of the MOG can be affected by numerous operating conditions, including wind speed, water content of the material, gradient of the field, etc. Accordingly, observing and adjusting the spreader tool manually can be relatively complex and time consuming, especially where the operating conditions vary across the area to be harvested. This can be further complicated by weather conditions, lighting conditions and the like.

In an attempt to address this problem it is known to utilise sensors, e.g. wind direction sensors, ultrasonic sensors, cameras and the like operable to infer or monitor the distribution of the MOG in real time. In some instances, information relating to the observed distribution may be relayed to the operator of the combine (e.g. through a user interface within the operator cab) who may use this information to adjust operation of the spreader tool. In further solutions, control of the spreader tool has been at least partly automated based on data from such sensors, for example by controlling the direction of one or more steering vanes/deflectors in an attempt to account for wind direction. However, such systems are relatively complex and no complete solution has been realised.

It would be advantageous to improve upon these known systems such that the distribution of material from an agricultural machine can be monitored and optionally controlled more effectively and efficiently.

SUMMARY OF THE INVENTION

In an aspect of the invention there is provided a system for monitoring the distribution of residue material from a spreader tool of an agricultural machine, the system comprising: a sensing arrangement comprising one or more sensors defining a sensing region corresponding to an operating area of the spreader tool; a lighting arrangement comprising one or more light sources for providing illumination to at least part of the sensing region; and one or more controllers, configured to: determine a capture state of one or more sensors of the sensing arrangement; and output one or more control signals for the lighting arrangement for controlling operation of the one or more light sources in dependence on the capture state of the one or more sensors.

Advantageously, the present invention provides for control over the lighting arrangement to synchronise the illumination provided by the light source(s) with the operation of the sensing arrangement. In this way, the system may be operable and provide the means to effectively monitor residue spread even in low light conditions.

The one or more sensors may include an imaging sensor. In presently preferred embodiments the imaging sensor comprises a global shutter camera. A global shutter camera advantageously reads all pixels simultaneously. The one or more sensors may include a rolling shutter camera.

The sensor(s) may be mounted or otherwise coupled to the agricultural machine such that the sensing region is positioned rearwards of the machine. The sensor(s) may be mounted or otherwise coupled to the rear of the machine, for example, or in some embodiments to an unloading auger of the machine providing a substantially top-down view of a sensing region rearwards of the agricultural machine.

The lighting arrangement preferably comprises one or more LED lamps. LED lamps may be more energy efficient when compared with incandescent lamps or other light sources, and may advantageously emit light at full brightness substantially instantaneously without a warm up delay which might otherwise be associated with other types of light source. This makes LED lamps particularly suited to use cases whereby a short flash of illumination may be required. Furthermore, frequent flashing of LED lamps may not reduce the lifetime of the light source which might be expected from fluorescent lamps, for example. In presently preferred embodiments the lighting arrangement comprises at least two LED lamps, which may include a first LED lamp mounted or otherwise coupled to the agricultural machine in a position corresponding to a first side of the agricultural machine and a second LED lamp mounted or otherwise coupled to the agricultural machine in a position corresponding to a second side of the agricultural machine.

The light source(s) may alternatively comprise one or more of: a xenon lamp, a krypton lamp, a halogen lamp; and an argon lamp.

The light source(s) may be operated in a mode whereby a short, high energy flash of illumination is provided when compared with a continuous operational mode. This may be referred to herein as a "strobe output pulse". This may prevent damage occurring due to overworking of the light source(s) were the source(s) to be operated at the high(er) energy level for a prolonged period of time whilst retaining the advantage of the more luminous illumination output whilst activated. A more luminous output may provide the ability to better resolve features within data obtained for the sensing region.

A capture state may correspond to a time period whereby the sensor(s) are exposed. This may be referred to herein as an "exposure time" for the sensor(s). The one or more controllers may be configured to control operation of the lighting arrangement such that the one or more light sources provide illumination to at least part of the sensing region for at least part of the exposure time of the sensor(s). The one or more controllers may be configured to control operation of the lighting arrangement such that the one or more light sources provide illumination to at least part of the sensing region for the exposure time of the sensor(s).

The system, e.g. one or more of the controller(s), may be configured to receive an operational signal indicative of an operational state of the sensing arrangement. The system may be configured to determine, from the operational signal, the capture state of the one or more sensors.

The system may be operable to control operation of the sensing arrangement. The example, the one or more controllers may be operable to control output of one or more control signals for controlling operation of the sensor(s) of the sensing arrangement. In some embodiments, the one or more controllers may be configured to generate and output a trigger signal for triggering operation of the sensor(s) of the sensing arrangement, for example, to trigger the sensor(s) to a capture state for capturing sensor data indicative of a measure of residue material within the sensing region of the sensing arrangement.

The one or more controllers may be configured to control the timing of output of the control signal(s) for the lighting arrangement and the trigger signal for the sensing arrangement such that the one or more light sources provide illumination to at least part of the sensing region for at least part of an exposure time of the sensor(s). The one or more controllers may be configured to control the timing of output of the control signal(s) for the lighting arrangement and the trigger signal for the sensing arrangement such that the one or more light sources provide illumination to at least part of the sensing region for the exposure time of the sensor(s).

The one or more controllers may be configured to control operation of the lighting arrangement and/or the sensing arrangement periodically, e.g. in a manner such that sensor data is obtained for the sensing region at set time intervals. The time period between successive operations may be predefined, may be user selectable, and/or may be dependent on one or more operational parameters. For example, in some embodiments the time period between successive operations may be dependent on an operational speed of the agricultural machine, such as a forward speed of the agricultural machine, and/or one or more components thereof, for example an operational speed of the spreader tool. It may be advantageous to reduce the time period between successive operations for higher operational speeds of the machine or spreader tool, for example.

The one or more controllers may be configured to control operation of the lighting arrangement and/or the sensing arrangement in dependence on an operational state of the spreader tool. For example, it may be advantageous to synchronise operation of the sensing arrangement with the spreader tool such that sensor data obtained from the sensing arrangement at different times is directly comparable, e.g. it is obtained under the same operating conditions. In embodiments, this may comprise controlling the time period between successive operations of the system in dependence on an operational speed of the spreader tool.

The system may comprise or may be operatively coupled to a light sensor. The light sensor may be configured to obtain data indicative of an ambient light level in the environment of the agricultural machine. The system may be operable to control operation of the lighting arrangement in dependence on data received from the light sensor. The system may be operable to control operation of the lighting arrangement in dependence on a time signal indicative of the time of day of operation of the agricultural machine.

In a further aspect of the invention there is provided a control system for monitoring the distribution of residue material from a spreader tool of an agricultural machine, the control system comprising one or more controllers, and being configured to: determine a capture state of one or more sensors of the sensing arrangement; and output one or more control signals for a lighting arrangement for controlling operation of one or more light sources thereof for providing illumination to at least part of the sensing region in dependence on the capture state of the one or more sensors.

The one or more controllers may collectively comprise an input (e.g. an electronic input) for receiving one or more input signals indicative of the operational state of the sensing arrangement. The one or more controllers may collectively comprise one or more processors (e.g. electronic processors) operable to execute computer readable instructions for controlling operation of the control system, for example to determine the capture state of the one or more sensors. The one or more processors may be operable to generate one or more control signals for controlling operation of the one or more light sources. The one or more controllers may collectively comprise an output (e.g. an electronic output) for outputting the one or more control signals.

The one or more controllers of the control system may be configured in any manner of the one or more controllers of the system described hereinabove with reference to the first aspect of the invention.

An aspect of the invention provides an agricultural machine comprising the system and/or control system of any preceding aspect of the invention. Optionally the agricultural machine comprises a harvesting machine, such as a combine harvester.

In a further aspect of the invention there is provided a method of monitoring the distribution of residue material from a spreader tool of an agricultural machine, the method comprising: determining a capture state of one or more sensors of a sensing arrangement, the one or more sensors defining a sensing region corresponding to an operating area of the spreader tool; and controlling operation of one or more light sources of a lighting arrangement for providing illumination to at least part of the sensing region in dependence on the capture state of the one or more sensors.

The method of the present aspect may comprise any one or more of the features of any preceding aspect as desired or appropriate. Components equivalent across aspects are to be understood as optionally being configured in the manner discussed above, for example, the method may comprise controlling operation of one or more components where the components are as described herein in reference to the system or control system of the preceding aspects.

The method may comprise operating the light source(s) in a mode whereby a short, high energy flash of illumination is provided when compared with a continuous operational mode. This may be referred to herein as a "strobe output pulse".

A capture state may correspond to a time period whereby the sensor(s) are exposed. This may be referred to herein as an "exposure time" for the sensor(s). The method may comprise controlling operation of the lighting arrangement such that the one or more light sources provide illumination to at least part of the sensing region for at least part of the exposure time of the sensor(s). The method may comprise controlling operation of the lighting arrangement such that the one or more light sources provide illumination to at least part of the sensing region for the exposure time of the sensor(s).

The method may comprise determining the capture state of the one or more sensors.

The method may comprise controlling operation of the sensing arrangement, e.g. by controlling operation of one or more sensors thereof. In some embodiments, the method may comprise triggering operation of the sensor(s) of the sensing arrangement, for example, to trigger the sensor(s) to a capture state for capturing sensor data indicative of a measure of residue material within the sensing region of the sensing arrangement.

The method may comprise controlling the timing of operation of the lighting arrangement and the sensing arrangement such that the one or more light sources provide illumination to at least part of the sensing region for at least part of an exposure time of the sensor(s). The method may comprise controlling the timing of the operation of the lighting arrangement and the sensing arrangement such that the one or more light sources provide illumination to at least part of the sensing region for the exposure time of the sensor(s).

The method may comprise controlling operation of the lighting arrangement and/or the sensing arrangement periodically, e.g. in a manner such that sensor data is obtained for the sensing region at set time intervals. The time period between successive operations may be predefined, may be user selectable, and/or may be dependent on one or more operational parameters. For example, in some embodiments the time period between successive operations may be dependent on an operational speed of the agricultural machine, such as a forward speed of the agricultural machine, and/or one or more components thereof, for example an operational speed of the spreader tool. It may be advantageous to reduce the time period between successive operations for higher operational speeds of the machine or spreader tool, for example.

The method may comprise controlling operation of the lighting arrangement and/or the sensing arrangement in dependence on an operational state of the spreader tool. For example, it may be advantageous to synchronise operation of the sensing arrangement with the spreader tool such that sensor data obtained from the sensing arrangement at different times is directly comparable, e.g. it is obtained under the same operating conditions. In embodiments, this may comprise controlling the time period between successive operations of the system in dependence on an operational speed of the spreader tool.

The method may comprise controlling operation of the lighting arrangement in dependence on an ambient light level. The method may comprise controlling operation of the lighting arrangement in dependence on time of day of operation of the agricultural machine.

In a further aspect of the invention there is provided computer software comprising computer readable instructions which, when executed by one or more processors, causes performance of the method of the preceding aspect of the invention.

A further aspect of the invention provides a computer readable storage medium comprising the computer software of the preceding aspect of the invention. Optionally, the storage medium comprises a non-transitory computer readable storage medium.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
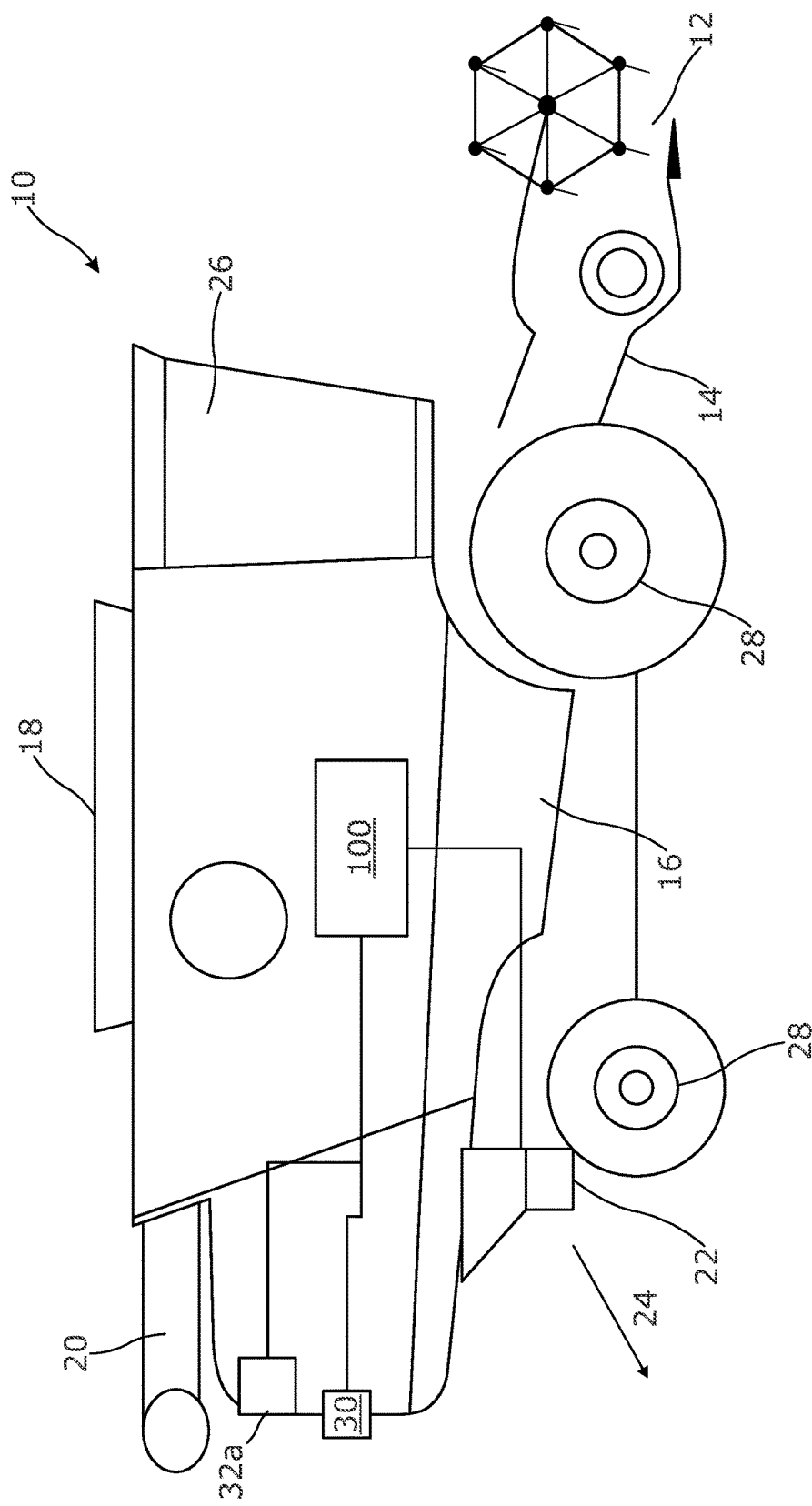
FIG. 1 is a schematic side cross-sectional view of an agricultural harvester embodying aspects of the invention.
Figure 3:
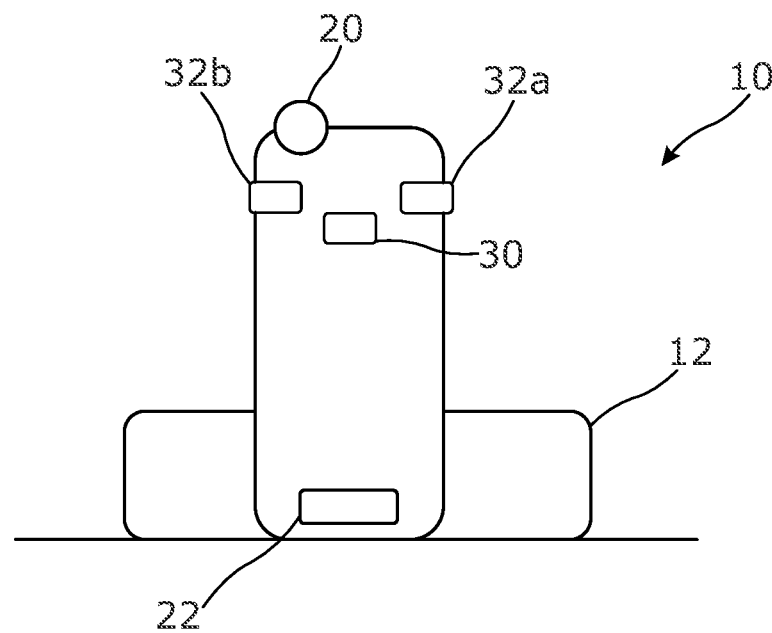
FIG. 3 is a schematic rear view of the agricultural harvester of FIG. 1.

FIGS. 1 and 3 illustrate an agricultural machine, and specifically a combine 10, embodying aspects of the present invention.

The combine 10 is coupled to a header 12 which is operable, in use, to cut and gather a strip of crop material as the combine 10 is driven across a field/area to be harvested during a harvesting operation. A conveyor section 14 conveys the cut crop material from the header 12 into a crop processing apparatus 16 operable to separate grain and non-grain (i.e. material other than grain (MOG)) as will be appreciated. It is noted here that apparatus for separating grain and non-grain material are well-known in the art and the present invention is not limited in this sense. The skilled person will appreciate that numerous different configurations for the crop processing apparatus may be used as appropriate. Clean grain separated from the cut crop material is collected in a grain bin 18, which may be periodically emptied, e.g. into a collection vehicle, storage container, etc. utilising unloading auger 20. The remaining non-grain material (MOG)/residue is separately moved to a spreader tool 22 which is operable in use to eject the non-grain material or MOG from the rear of the combine 10 and onto the ground. In FIG. 1, this is represented by arrow 24 which illustrates the MOG being ejected rearwards from the combine 10. It will be appreciated that in some embodiments the combine 10 may also include a chopper tool positioned, for example, between the crop processing apparatus 16 and the spreader tool 22 and operable, in use, to cut the MOG/residue before it is spread by the spreader tool 22.

The combine 10 also typically includes, amongst other features, an operator cab 26, wheels 28 and an engine (not shown) or other motive means.

As will be discussed in detail herein, the combine 10 additionally includes a sensing arrangement including a camera 30 mounted to the rear of the combine 10 and having a sensing region which is rearwards of the combine 10. As is discussed herein, the camera 30 is used to obtained image data of the sensing region and in particular to obtain a measure of residue material spread by the spreader tool 22. Combine 10 also includes a lighting arrangement which includes first and second LED lamps 32a, 32b. The LED lamps are used, by a control system 100 of the combine 10, to illuminate at least part of the sensing region in the manner discussed herein.

Figure 2:
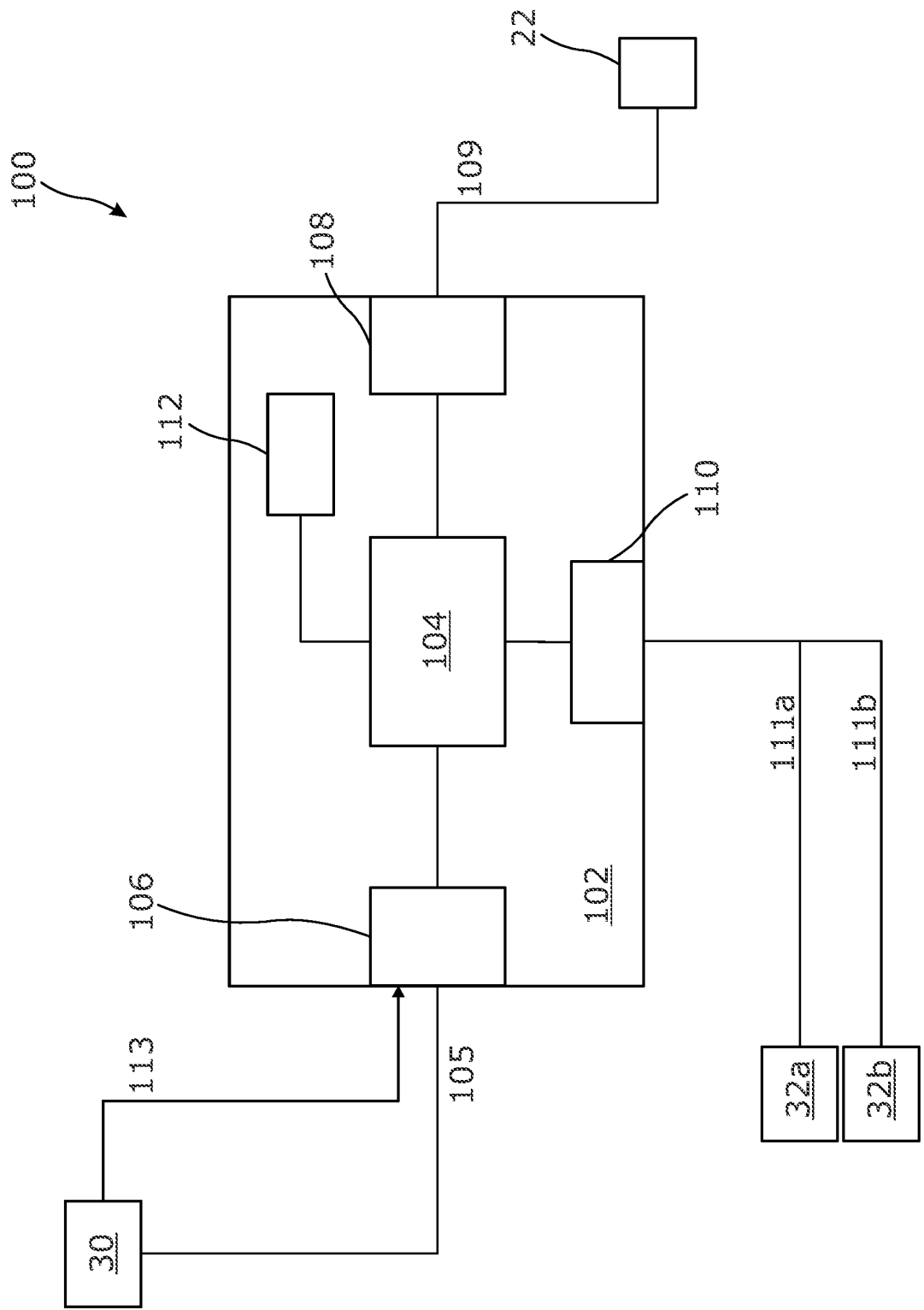
FIG. 2 is a schematic view of an embodiment of a control system of the invention.

FIG. 2 illustrates the control system 100 further. As shown, control system 100 comprises a controller 102 having an electronic processor 104, an electronic input/output modules 106, 108, 110. The processor 104 is operable to access a memory 112 of the controller 102 and execute instructions stored therein to perform the steps and functionality of the present invention, for example to output control signals 111a, 111b via output module 110 for controlling operation of the first and/or second LED lamps 32a, 32b for illuminating the environment in the sensing region of the sensing arrangement proximal to the spreader tool 22. Input/output module 106 is operably coupled to the camera 30, and is used to output control signals 105 thereto for controlling operation of the camera 30, e.g. to trigger operation of the camera 30 as discussed herein, and/or to receive image data from the camera 30 in the form of input signals 113. The image data from the camera 30 may subsequently be used to determine one or more characteristics of spread of residue material associated with the spreader tool 22. Such determination falls outside of the scope of the present invention so is not discussed further herein. Input/output module 108 is operably coupled to spreader tool 22, and is used to receive operational signals 109 from the spreader tool 22 indicative of the operational state of the spreader tool 22. In an extension of the present aspect, input/output module 108 may be used to output control signals to the spreader tool 22 to control operation thereof.

Figure 4:
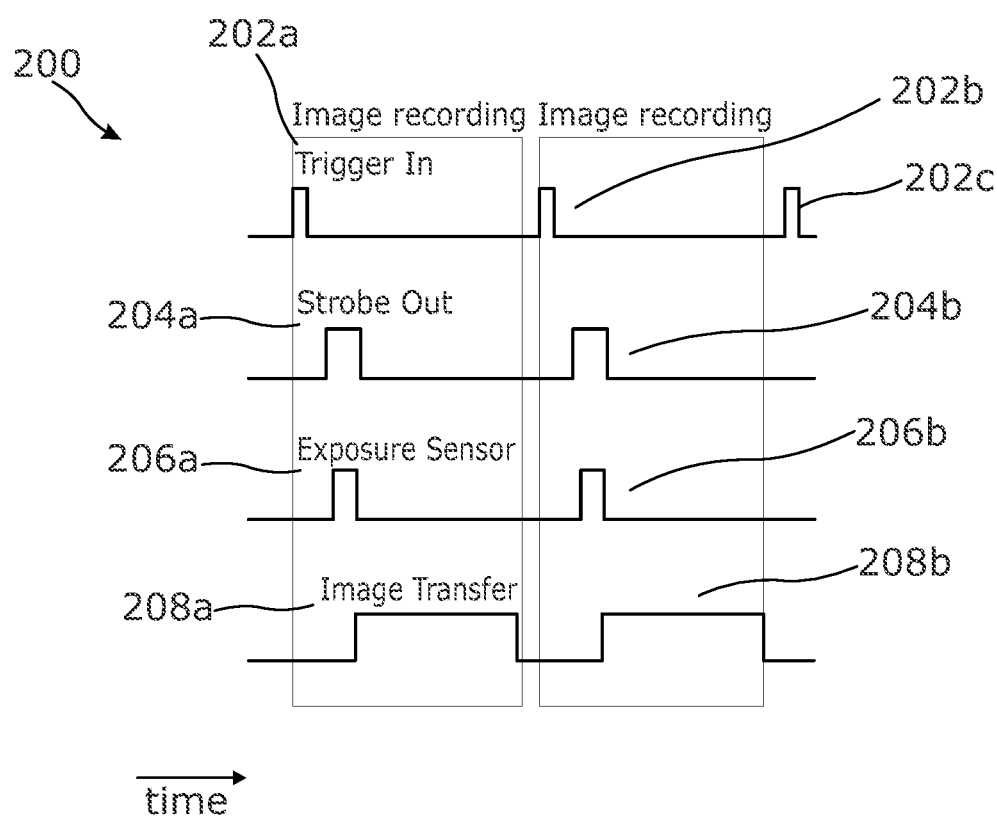
FIG. 4 illustrates the operational use of aspects of the invention.

The operational use of the present invention is described herein with reference to the Figures, and FIG. 4 specifically.

In general, the illustrated embodiments of the invention relate to the use of the LED lamps 32a, 32b to selectively illuminate the sensing region to provide a short burst/flash of light in the sensing region to improve data obtained by the camera 30, particularly in low light conditions. Control of the lamps 32a, 32b is performed in dependence on the determined capture state of the camera 30 to selectively illuminate the sensing region only during an exposure time of the camera 30. As discussed herein, the LED lamps 32a, 32b are particularly suited to such a use.

In the illustrated embodiment, processor 104 is configured to control operation of the camera 30, although control over the camera 30 may be performed by a further control unit and the processor 104 may instead receive input signals 113 indicative of the operational state of the camera 30.

FIG. 4 illustrates the process 200 of obtaining images from the camera 30 utilising the present invention, and specifically two consecutive images and the process steps involved over time. The process begins with a trigger 202. The trigger may be received at the processor 104 and/or be generated by the processor 104. As a next step, control signals 111a, 111b are output to respective LED lamps 32a, 32b for causing the lamps 32a, 32b to illuminate the sensing region (or at least part of the sensing region) for an illumination period, (step 204). This illumination period entirely encompasses (in time) an exposure time of the camera 30. Specifically, whilst the lamps 32a, 32b are providing illumination of the sensing region, control signals 105 are output to camera 30 for triggering exposure thereof during the illumination period (step 206). As a final step (step 208), the image data is transferred from the camera 30 to the processor 104, e.g. via signals 113 received at input/output module 106. One or more subsequent processing steps may then be performed on the images obtained by the camera 30, e.g. to extract/determine one or more characteristics of the residue spread associated with the spreader tool 22. Once the transfer step 208 has been completed, the process 200 is repeated and further images are obtained of the sensing region.

As discussed herein, this process may be repeated periodically, e.g. in a manner such that sensor data is obtained for the sensing region at set time intervals. The time period between successive operations may be predefined, may be user selectable, and/or may be dependent on one or more operational parameters, which can include an operational speed of the agricultural machine, such as a forward speed of the agricultural machine, and/or one or more components thereof, for example an operational speed of the spreader tool. In practice, this may involve the processor 104 being operably coupled to one or more control units of the combine 10 responsible for control over the one or more operational parameters, and the processor 104 may be configured to control operation/timing of the process 200 based thereon.

In an extension of the illustrated embodiment, the processor 104 is configured to control operation of the lamps 32a, 32b and/or the camera 30 in dependence on an operational state of the spreader tool 22 with the specific aim of synchronising operation of the camera 30 with the spreader tool 22 such that sensor data obtained from the camera 30 at different times is directly comparable, e.g. it is obtained under the same operating conditions. In practice, this may involve the processor 104 being operably coupled to the spreader tool 22, e.g. via input/output module 108 as discussed herein, and the processor 104 be configured to control operation/timing of the process 200 based thereon.

In an extension of the illustrated embodiment, the arrangement may comprise or may be operatively coupled to a light sensor, e.g. an ambient light sensor for determining an ambient light level in the environment of the combine 10. This may be received at the processor 104 via a further input/output module, for example, and interpreted thereby to determine the ambient light level and control operation of the LED lamps 32a, 32b in dependence thereon. For instance, it may not be necessary to illuminate the environment using the lamps 32a, 32b whilst there is a high level of natural light.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

It will be appreciated that the above embodiments are discussed by way of example only. Various changes and modifications can be made without departing from the scope of the present application.

The invention claimed is:

1. A system for monitoring distribution of residue material from a spreader tool of an agricultural machine, the system comprising:
 a sensing arrangement comprising at least one sensor defining a sensing region corresponding to an operating area of the spreader tool;
 a lighting arrangement comprising at least one light source for providing illumination to at least part of the sensing region; and
 at least one controller, configured to:
  determine a capture state of the at least one sensor of the sensing arrangement; and
  output at least one control signal for the lighting arrangement for controlling operation of the light sources based on the capture state of the sensor.

2. The system of claim 1, wherein the at least one sensor includes an imaging sensor, and wherein the imaging sensor comprises a global shutter camera.

3. The system of claim 1, wherein the lighting arrangement comprises at least one LED lamp.

4. The system of claim 1, wherein the capture state corresponds to an exposure time for the at least one sensor, and wherein the controller is configured to control operation of the lighting arrangement such that the at least one light source provides illumination to at least part of the sensing region for at least part of the exposure time of the at least one sensor.

5. The system of claim 1, wherein the controller is further configured to generate and output a trigger signal for triggering operation of the at least one sensor of the sensing arrangement to trigger the sensors to the capture state for capturing sensor data indicative of a measure of the residue material within the sensing region of the sensing arrangement.

6. The system of claim 5, wherein the controller is further configured to control the timing of the output of the control signal for the lighting arrangement and the trigger signal for the sensing arrangement such that the at least one light source provides illumination to at least part of the sensing region for at least part of an exposure time of the at least one sensor.

7. The system of claim 5, wherein the controller is further configured to control operation of the lighting arrangement and/or the sensing arrangement periodically such that the sensor data is obtained for the sensing region at set time intervals.

8. The system of claim 7, wherein a time period between successive operations is at least one of the following: predefined; user selectable; and dependent on at least one operational parameter.

9. The system of claim 8, wherein the time period between successive operations is dependent on at least one of the following:
 an operational speed of the agricultural machine;
 a forward speed of the agricultural machine;
 an operational speed of at least one component of the agricultural machine; and
 an operational speed of the spreader tool.

10. The system of claim 1, further comprising a light sensor configured to obtain data indicative of an ambient light level in the environment of the agricultural machine, wherein the system is operable to control operation of the lighting arrangement based on data received from the light sensor.

11. The system of claim 1, operatively coupled to a light sensor configured to obtain data indicative of an ambient light level in the environment of the agricultural machine wherein the system is operable to control operation of the lighting arrangement based on data received from the light sensor.

12. The system of claim 1, operable to control operation of the lighting arrangement based on a time signal indicative of the time of day of operation of the agricultural machine.

13. An agricultural machine comprising the system of claim 1.

14. A control system for monitoring distribution of residue material from a spreader tool of an agricultural machine, the control system comprising at least one controller, configured to:
 determine a capture state of at least one sensor of a sensing arrangement; and
 output at least one control signal for a lighting arrangement for controlling operation of at least one light source providing illumination to at least part of a sensing region based on the capture state of the at least one sensor.

15. A method of monitoring distribution of residue material from a spreader tool of an agricultural machine, the method comprising:
 determining a capture state of at least one sensor of a sensing arrangement, wherein the at least one sensor defines a sensing region corresponding to an operating area of the spreader tool; and
 controlling operation of at least one light source of a lighting arrangement for providing illumination to at least part of the sensing region based on the capture state of the at least one sensor.

* * * * *